United States Patent [19]
Linsky

[11] Patent Number: 5,199,050
[45] Date of Patent: Mar. 30, 1993

[54] PSEUDORANDOM (PN) SIGNAL SYNCHRONIZATION CIRCUIT AND RELATED METHOD

[75] Inventor: Stuart T. Linsky, San Pedro, Calif.
[73] Assignee: TRW Inc., Redondo Beach, Calif.
[21] Appl. No.: 681,039
[22] Filed: Apr. 5, 1991
[51] Int. Cl.[5] .............................................. H04L 7/00
[52] U.S. Cl. .................................. 375/115; 370/107; 364/715.11
[58] Field of Search ..................... 375/1, 115; 370/107; 364/715.11

[56] References Cited

U.S. PATENT DOCUMENTS

| | | | |
|---|---|---|---|
| 4,119,926 | 10/1978 | Frosch et al. | 375/115 |
| 4,221,005 | 9/1980 | La Flame | 375/115 |
| 4,475,215 | 10/1984 | Gutleber | 375/1 |

Primary Examiner—Curtis Kuntz
Assistant Examiner—Young Tse
Attorney, Agent, or Firm—Noel F. Heal; G. Gregory Schivley; Ronald L. Taylor

[57] ABSTRACT

A technique for producing detection and synchronization signals with respect to a received pseudo-random (PN) signal, with optimum signal-to-noise performance and reduced complexity and cost of hardware. Correlation of the received signal with early and late reference signals is performed in such a way that multiplication hardware is time-shared to produce an early/late sum signal for use in signal detection, and an early/late difference signal for use in synchronization, but without the degradation of performance usually resulting from time-sharing of components. In one basic form of the invention, the received signal is multiplied by one of the local reference signals, and the resulting product is demultiplexed over two alternate paths for computation of the required sum and difference signals. In a preferred form of the invention, integration of the signals over chip intervals is performed prior to multiplication with the local reference signal, thereby further reducing the hardware complexity eliminating components in the two alternate paths.

10 Claims, 3 Drawing Sheets

PSEUDORANDOM (PN) SIGNAL SYNCHRONIZATION CIRCUIT AND RELATED METHOD

BACKGROUND OF THE INVENTION

This invention relates generally to communications systems and, more particularly, to the reception of communication signals containing pseudorandom code sequences. A pseudorandom sequence is a sequence produced by some definite arithmetic process, but satisfying one or more of the standard tests for randomness. As used in communications, a pseudorandom code sequence is a sequence of digital, and typically binary, numbers, that repeats itself after a time, but is long enough that the sequence can be considered random for most purposes. Pseudorandom code sequences are sometimes referred to as pseudorandom noise signals, or pseudo noise signals, or PN signals. For brevity, the term PN signals will be used throughout this specification.

PN signals are used in a number of different applications, including spread spectrum communications, distance ranging equipment, synchronization of burst communications systems, navigation systems using orbiting satellite, such as the global positioning system (GPS). What all these applications have in common is that they have the capability to detect a known PN signal in the presence of noise and to estimate the arrival time of the signal at a receiver. It may generally be assumed that the receiver has no knowledge of the phase of the carrier signal on which the PN signals are modulated. This is said to be "incoherent" demodulation, as distinguished from "coherent" demodulation, in which the frequency and phase of the received carrier signal must be precisely established. Further, although PN signals may take various forms, the present invention is concerned with PN signals that are bi-phase modulated antipodal signals of constant energy. That is to say, the carrier signal is modulated by switching its phase between zero and 180 degrees to encode a binary pseudorandom sequence.

There are slightly different performance requirements for specific applications, but in general each application involving PN signals will have two functional requirements. First there is a requirement to know when the received signal time phase is within some time window of the local receiver time phase, this requirement being referred to as signal detection. Second, if the signal is detected, there is a requirement to determine whether the time of arrival of the signal is "early" or "late" compared with some reference time, and preferably also provide a quantitative measure of the earliness or lateness of the signal. The early/late measurement and signal detection information can then be used by either a transmitter or a receiver to adjust its time phase for synchronization.

The problem of detecting a known signal in the presence of noise, and estimating its time of arrival, without a knowledge of the carrier phase, is a classic one in the radar field, and various solutions have been developed. In general minimum required signal-to-noise ratio (SNR) is considered the optimal solution to the problem.

All the receiver architectures discussed in this specification use correlation for detection and synchronization of the received PN signal. The received signal is correlated non-coherently with a local representation of the transmitted signal. This is a complex correlation and, since phase is unknown, only magnitude information is retained in the correlation. This magnitude is then compared with a threshold level that is appropriately selected to provide a probability of detection of the signal.

To determine if the signal is early or late, it is correlated to both an early and a late local signal, the difference between the two correlation magnitudes providing a measure of time error in the received signal. The classic circuit architecture for handling this includes two parallel correlation paths, one for the early correlation and the other for the late correlation. Signal detection is effected by summing the early and late correlation magnitudes and comparing the result to a threshold. Alternatively, the early and late correlation magnitudes can be separately compared to thresholds, with detection being declared if either comparison yields a magnitude over the threshold. This process is analogous to a delay lock loop used in spread spectrum systems.

An alternative to the parallel correlation process of the delay lock approach is to time-share the correlation hardware between the two required correlations of early and late signals. Time-sharing the receiver hardware to correlate the received signal with an early reference half of the time, and a late reference the rest of the time, reduces the complexity and cost of the hardware, but at a cost of approximately 3 dB in SNR performance. Intuitively, it can be seen that performance will be degraded by a factor of two, because each correlation path is receiving data for only half of the time, as compared with a circuit using two sets of correlation hardware in parallel correlation paths. The time-sharing correlation circuit is analogous to the tau-dither approach in spread spectrum systems. Clearly, there is a design trade-off between cost and performance. Better SNR performance is obtained from the delay lock approach, but at a cost of complexity. A lower cost is obtained from the tau-dither approach, but this results in degraded SNR performance. The present invention eliminates this difficult design choice and provides the optimal SNR performance of the delay lock circuit, but with a cost and complexity similar to the tau-dither circuit.

SUMMARY OF THE INVENTION

The present invention resides in a PN signal detection and synchronization circuit that performs time-shared correlations between the received signal and early and late local reference signals, respectively, but without degradation in the signal-to-noise-ratio (SNR) performance, as compared with a circuit that performs these correlations in two parallel sets of hardware. Thus the circuit of the invention provides optimal SNR performance without the complexity and cost of parallel correlation hardware.

Briefly, and in general terms, the circuit of the invention comprises a source of early and late reference PN signals spaced apart in time by one chip interval of the PN signal; a single digital multiplier, for multiplying successive values of the received signal and the early reference signal, to produce a product signal; a demultiplexer, for directing the product signal over first and second alternate paths; and accumulation means associated with each of the alternate paths. The accumulation means accumulates (integrates) the product signal in each path, over a selected signal burst period, to produce for each burst period a signal on the first alternate path equivalent to the sum of the early and late signals, and a signal on the second alternate path equivalent to the difference between the early and late signals. The demultiplexer is controlled to select the first alternate path when the early and late reference signals have the same value, and to select the second alternate path when the early and late reference signals have different values. The digital multiplier is time-shared by the first and second alternate paths, but without loss of data or degradation in performance.

More specifically, the accumulation means includes an integrator, and first and second accumulators in the first and second alternate paths. The integrator functions to integrate values of the received PN signal over each chip interval of the PN signal, prior to multiplication by the early reference signal. The first accumulator functions to accumulate signals equivalent to the sum of the early and late reference signals over each successive burst period; and the second accumulator functions to accumulate signals equivalent to the difference between the early and late reference signals over each successive burst period. In this configuration, integration of the received signal over each chip period is performed prior to multiplication by the early reference signal.

In one preferred embodiment of the invention the integrator operates on the received signal in analog form, and the circuit further comprises an analog-to-digital converter between the integrator and the digital multiplier.

In the preferred embodiment, the first alternate path further includes a magnitude squaring circuit, to produce a signal equivalent to the square of the sum of the early and late reference signals, for use in detection of the received signal, and the second alternate path further includes a dot product circuit for producing a signal for use in synchronizing operations. The dot product circuit has one input equivalent to the sum of the early and late reference signals, derived from the first alternate path, and one input equivalent to the difference between the early and late reference signals, derived from the second alternate path. The dot product circuit produces a signal equivalent to the difference between the square of the early reference signal and the square of the late reference signal.

In method terms, the invention comprises the steps of generating early and late reference PN signals spaced apart in time by one chip interval of the received PN signal; digitally multiplying successive values of the received signal and one of the reference signals, to produce a product signal; demultiplexing the product signal over first and second alternate paths; and accumulating the product signal in each path, over a selected signal burst period, to produce for each burst period a signal on the first alternate path equivalent to the sum of the early and late signals, and a signal on the second alternate path equivalent to the difference between the early and late signals. The demultiplexing step includes selecting the first alternate path when the early and late reference signals have the same value, and selecting the second alternate path when the early and late reference signals have different values. Alternate forms of the method are possible, corresponding to the various forms of the circuit.

It will be appreciated from the foregoing that the present invention represents a significant advance in the field of communications systems that use PN sequences. In particular, the invention provides for optimal performance in terms of the minimum signal-to-noise ration required for operation, but minimizes the complexity, and therefore the cost, of the required hardware. Other aspects and advantages of the invention will become apparent from the following more detailed description, taken in conjunction with the accompanying drawings.

DESCRIPTION OF THE PREFERRED EMBODIMENT

Figure 1:
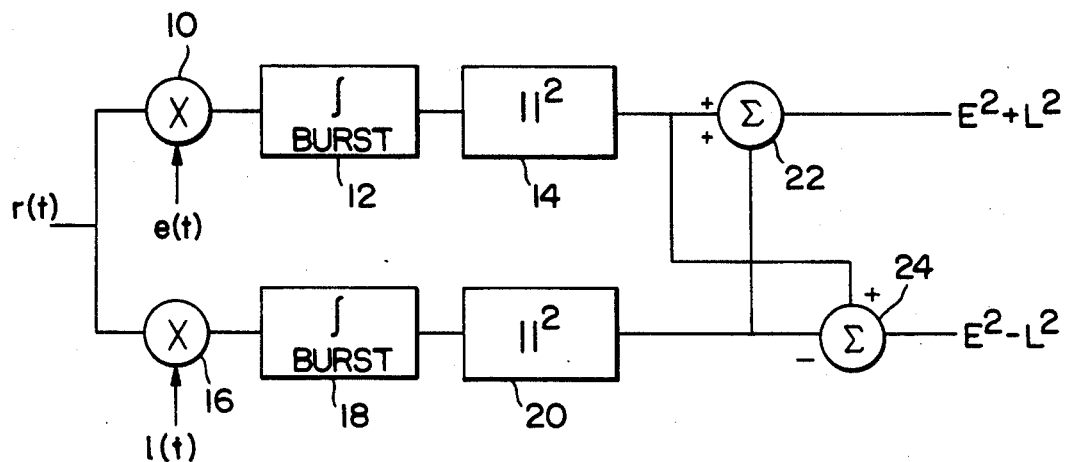
FIG. 1 is a block diagram of a circuit of the prior art, for generating detection and synchronization signals by parallel correlation of a received PN signal with early and late reference signals.

As shown in the drawings for purposes of illustration, the present invention is concerned with circuitry for detection and synchronization of a received signal containing a pseudorandom sequence, i.e. a PN signal. Prior to this invention, detection and synchronization of PN signals could be performed by either of two classic approaches, one of which involves parallel correlation of the received PN signal with separate early and late local reference signals, and the other of which provides for hardware simplification by time-sharing the correlation hardware between the two required correlation functions. This simplification has in the past resulted in a degradation in performance, as measured by the minimum signal-to-noise ratio (SNR) in which the apparatus can function successfully.

Figure 2:
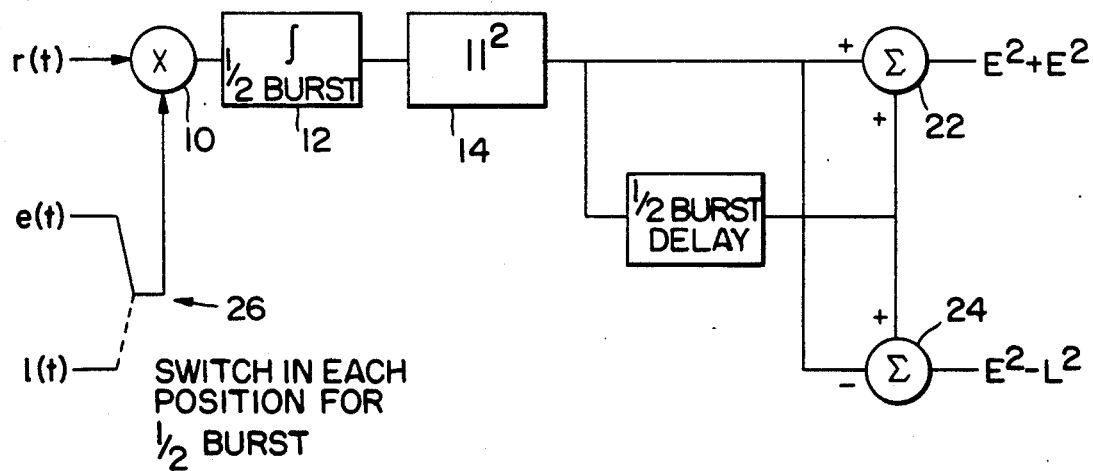
FIG. 2 is a block diagram of an alternative circuit of the prior art, similar to FIG. 1 except that correlation hardware is time-shared to produce the required signals.

More specifically, the two approaches of the prior art are shown in FIGS. 1 and 2. In FIG. 1, a received signal, designated r(t), is split along two parallel correlation paths, to correlate the received signal with an "early" local signal designated e(t), and a "late" local signal designated l(t). The early correlation path includes a multiplier, indicated by reference numeral 10, an integrator 12, and a magnitude squaring circuit 14. Similarly, the late correlation path includes a multiplier 16, an integrator 18, and a magnitude squaring circuit 20. The integrators 12 and 18 operate over a correlation "burst" interval, which includes a selected number of possible changes in the state of the baseband received signal. The received PN signal can potentially change state every "chip" interval. The squaring circuits 14 and 20 yield, respectively, a squared early correlated magnitude $E^2$ and a squared late correlated magnitude $L^2$. These magnitudes are applied to a first summation circuit 22, which produces a sum signal equivalent to $E^2+L^2$, and are also applied to a second summation circuit 24 configured to perform subtraction of its inputs and produce a difference signal equivalent to $E^2-L^2$.

Significant hardware savings are effected in the circuit of FIG. 2, which includes only one multiplier 10, one integrator 12 and one magnitude squaring circuit 14. The e(t) and l(t) signals are applied alternately to the multiplier, as indicated by the switch at 26. The signal generated by the squaring circuit 14 is alternately $E^2$ and $L^2$, and is split into two paths, one of which is delayed by one-half of a burst internals on one path. As before, the summation circuits 22 and 24 provide output signals equivalent to $E^2+L^2$ and $E^2-L^2$, respectively, for use in detection and synchronization of the received PN signal.

Figure 3:
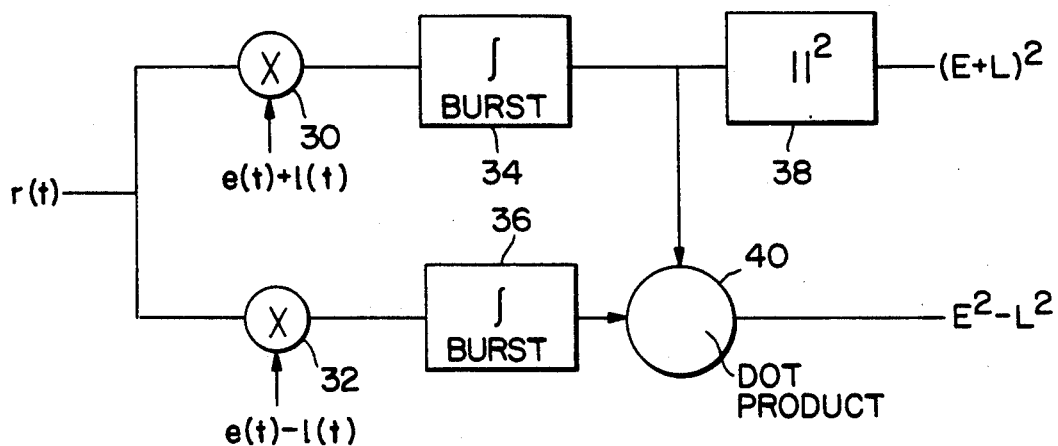
FIG. 3 is a block diagram of an alternate signal correlation circuit, in which parallel correlation paths are used but in which a received signal is correlated with sum and difference signals derived from the early and late reference signals.

FIG. 3 shows an alternate architecture also using, like FIG. 1, parallel correlation paths. However, instead of correlating the received signal to early and late references, this circuit correlates the received signal to the algebraic sum, e(t)+l(t), of the early and late references, and the algebraic difference, e(t) l(t), between the early and late references. The circuit includes two multipliers 30 and 32, two integrators 34 and 36, and a single magnitude squaring circuit 38, which produces an output equivalent to the square of the sum, i.e. $(E+L)^2$. The outputs of the integrators 34 and 36 are also input to a dot product circuit 40, which produces a signal equivalent to a difference signal $E^2-L^2$, derived from the product $(E+L).(E-L)$. At first it may seem that nothing is gained in this approach, as compared to that of FIG. 1, but there are some interesting properties of the sum and difference signals, for a particular choice of time window, that render the circuit worthy of closer study.

The time difference between the early and late references is selected in the present invention to be $\pm\frac{1}{2}$ of a "chip" width. A chip is the minimum time interval in which there may be change in the binary value of the received baseband signal. After every chip interval, the value of the signal may either change or not change, depending on the code sequence being received. The window width corresponds to the distance, in time, between the early and late reference signals. Selection of this distance has in the past usually involved another design trade-off. Spreading the early and late references further apart widens the window but degrades early/late performance. The wider window width reduces search time, or time to acquire the signal, but the fineness of early/late resolution is reduced. In the present invention, spacing the early and late reference signals at $\pm\frac{1}{2}$ of a chip width results in the sum and difference signals shown in TABLE 1 below, which assumes that early and late signals can have a value of either +1 or −1:

TABLE 1

| e(t) | l(t) | e(t) + l(t) | e(t) − l(t) |
|---|---|---|---|
| −1 | −1 | −2 | 0 |
| −1 | +1 | 0 | −2 |
| +1 | −1 | 0 | +2 |
| +1 | +1 | +2 | 0 |

It will be observed from this table that, ignoring a gain factor of 2, the sum and difference signals are either +1, −1, or 0. A more important observation is that the sum and difference signals have a special kind of orthogonality. The difference signal is always zero when the sum signal is nonzero, and vice versa. Another property of the sum and difference signals is that each nonzero sum or difference signal is identical with the corresponding value of e(t), again neglecting the scale factor of the sum and difference signals. Observation of these properties led to the basic circuit of the present invention, shown diagrammatically in FIG. 4.

Figure 4:
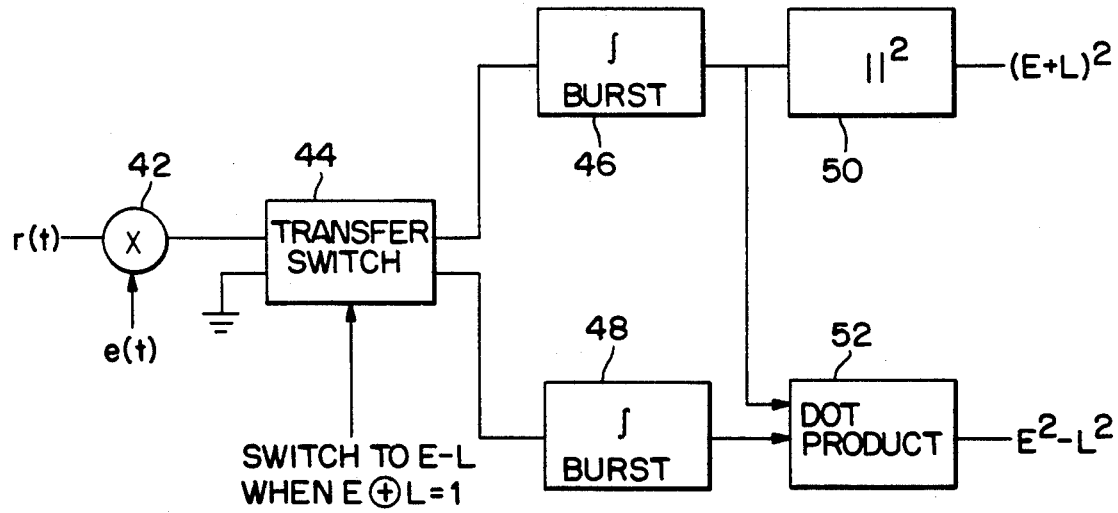
FIG. 4 is a block diagram of a circuit in accordance with the invention, derived from the circuit of FIG. 3, but using time-sharing without degradation of performance.

In accordance with the invention, and as a result of the properties noted above, parallel correlation hardware is not required and, instead, circuitry is time-shared in the determination of sum and difference early and late signals, but without the usual degradation of SNR performance. More specifically, as shown in FIG. 4 a single multiplier 42 correlates r(t) and e(t) inputs. As discussed above, the nonzero values of e(t)−l(t) and the nonzero values of e(t)+l(t) are all identical to the corresponding values of e(t) alone. A transfer switch 44, in the nature of a demultiplexer, switches the output of the multiplier 42 to either of two parallel paths, one leading to integrator circuit 46 and the other leading to integrator circuit 48. The transfer switch 44 is controlled to switch to the lower path, the E-L path, when the early and late signals have a different state. The remaining portions of FIG. 4 are similar to FIG. 3, including a magnitude squaring circuit 50, which produces an output equivalent to $(E+L)^2$, and a dot products circuit, which produces an output equivalent $E^2-L^2$, derived from the dot product $(E+L).(E-L)$.

As indicated in TABLE 1, when the early and late signals have a different state the sum signal is zero and only the nonzero difference signals have significance. Therefore, when the early and late signals are different the transfer switch directs the output of the multiplier 42 to the integrator 48 on the lower path of FIG. 4. Conversely, when the early and late signals are the same, the difference signals are zero and only the nonzero sum signals have significance. Then the transfer switch 44 directs the output of the multiplier 42 to the upper path in the figure, through the integrator 46. Control of the transfer 44 switch can be based on the exclusive OR of the early and late signals, using the binary (1 or 0) equivalents of their +1 and −1 values. Thus, when the exclusive OR of the early and late values is 1, this means that the two values are different, and that only the difference signal is significant. Conversely, when the exclusive OR of the early and late values is zero, the two signals are the same, and only the sum signal is significant.

The reason that the circuit of FIG. 4 works without imposing any performance degradation is that neither of the integrators 46 and 48 is deprived of input at any time, even though there is time sharing of input data from the multiplier 42. At times when one of the integrators 46, 48 is connected and is receiving input data, the other of the integrators is disconnected and is receiving nothing. But, because of the orthogonal nature of the data, the temporarily disconnected integrator would have received zero data even if it had been connected.

If the circuitry of FIG. 4 were to be implemented in analog form, there would be some difficulty in controlling the transfer switch 44, because an analog implementation of the required exclusive OR function would be awkward. Therefore, a digital implementation is preferable, and in fact leads to further simplification of the circuitry.

One approach to the implementation of FIG. 4 would be to digitize the received signal and perform the necessary correlation functions digitally. An alternative approach, which minimizes the required signal sampling rate and still retains optimal performance, is based on the following equation:

$$\int_B l(t)\, r(t)\, dt = \sum_{\text{Chips in } B} \int_C l(t)\, r(t)\, dt$$

where:
l(t) is the local reference (i.e. E−L or E+L),
r(t) is the received signal,
B is the correlation burst length, and
C is the chip period.

But within a chip period, the local reference l(t) is a constant, either +1, −1 or 0. Therefore, for each chip i, the value of l(t) can be taken out of the integration, as follows:

$$\int_B l(t)\, r(t)\, dt = \sum_{\text{Chip } i \text{ in } B} l_i \int_{C_i} r(t)\, dt$$

This means that if the integration of the received signal is performed over each chip period, the order of multiplication and integration can be reversed. Therefore, no analog multipliers or modulators are necessary and the local reference and the received signal can be multiplied digitally, where the multiplication only results in a possible change in sign (i.e. a full digital multiplier is not necessary).

Figure 5:
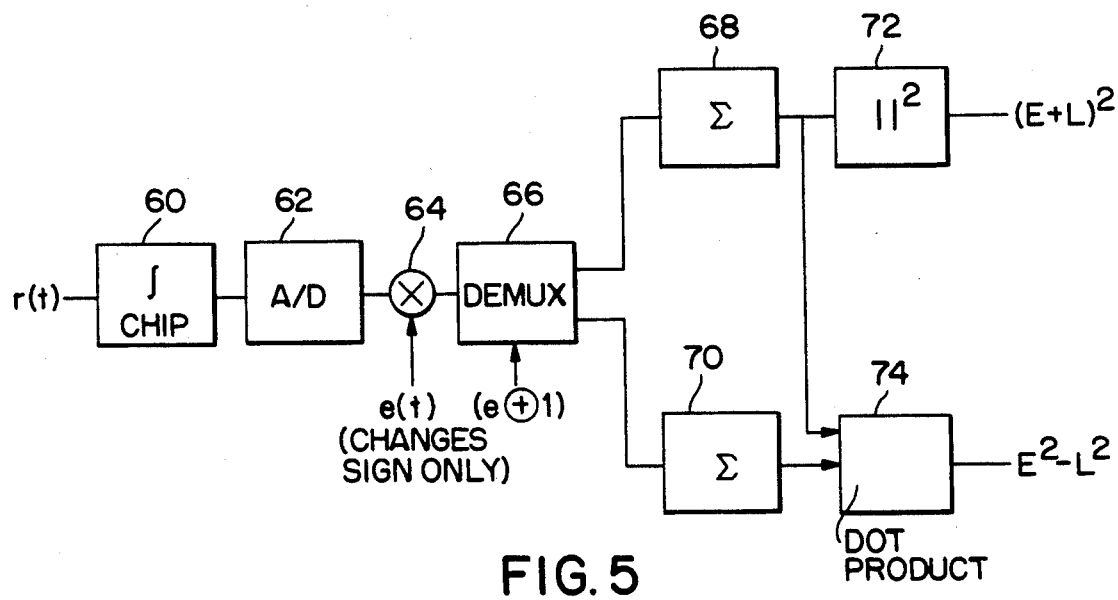
FIG. 5 is a block diagram similar to FIG. 4 and illustrating a further saving in hardware.

As modified in accordance with the above equations, the presently preferred embodiment of the invention is shown in FIG. 5. The received signal r(t) is integrated over each chip interval, by an analog integrator 60, and then converted to digital form by an analog-to-digital converter 62. The converted signals are digitally multiplied (sign inversion only) by an e(t) signal in multiplier 64, the output of which is demultiplexed over two signal paths, exactly as in FIG. 4, by a demultiplexer 66. Control of the demultiplexer is again based on the exclusive OR of the early and late signals, as indicated in the figure. An alternative (not shown) is to perform the multiplication after demultiplexing.

The upper path in FIG. 5 includes a digital summation circuit 68 and the lower path includes a digital summation circuit 70. These circuits digitally sum the signals that have been integrated over chip intervals, until a full correlation burst has been accumulated. Consistent with FIG. 4, FIG. 5 also shows a magnitude squaring circuit 72, producing a signal equivalent to $(E+L)^2$, and a dot product circuit 74, producing a signal equivalent to $(E^2-L^2)$.

Alternative processing steps may be performed to recover the early and late signals by summing and differencing the output signals (E+L) and (E−L) from the two summation circuits 68 and 70. The two recovered early and late signals can then be each magnitude squared and compared with separate thresholds as the criteria for detection. The difference of the magnitude squares may then be used for synchronization, in which case the illustrated dot product circuit is not needed.

Figure 6:
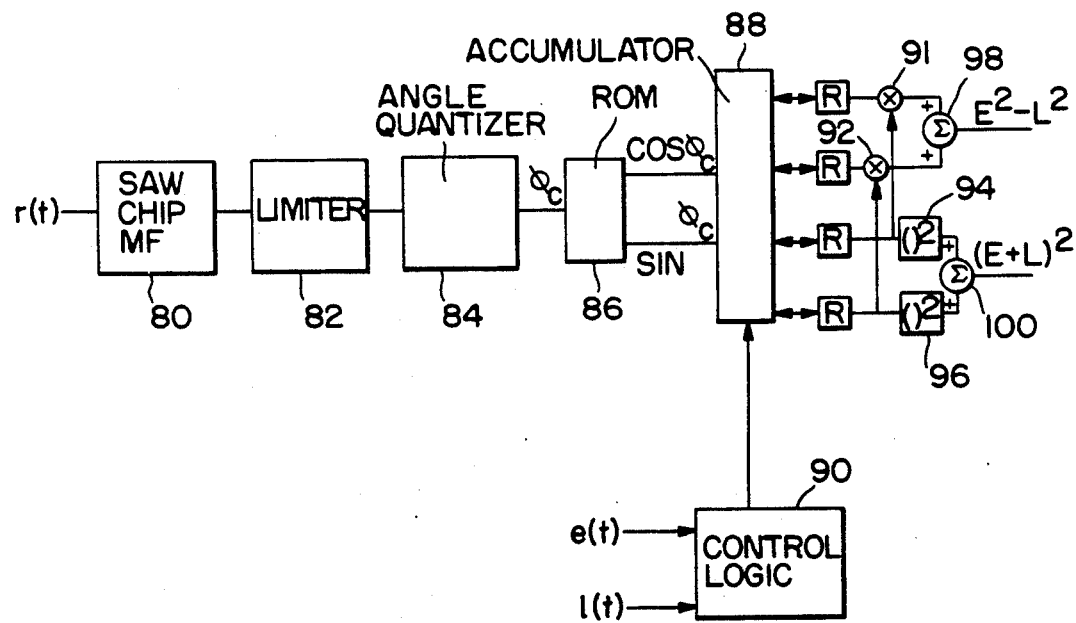
FIG. 6 is a block diagram of a specific implementation of the invention.

A more specific implementation choice is shown in FIG. 6. In this implementation, the received signal r(t) is first processed by a matched filter, such as a SAW (surface acoustic wave) filter, indicated at 80, the output of which is further processed by an amplitude limiter 82. In other approaches the received analog signal must be normalized, typically by means of an automatic gain control (AGC) circuit. Placing the limiter after the filter performs the normalization function with a minimum of signal degradation (approximately 1 dB), and simplifies threshold levels and the calculation of the number of bits that need to be retained at successive processing steps. Following the limiter 82 is an angle quantizer 84 for performing analog-to-digital (A/D) conversion. Because a limiter is used, only phase information is available at the limiter output and no other form of A/D conversion is needed. Use of the limiter renders the circuit immune to temperature variations that would otherwise affect the gain of analog signal components, and degrade detection performance. The digitized phase values from the quantizer 84 are used to access a read-only memory (ROM) 86, which provides corresponding sine and cosine values to a single accumulator 88. Control logic 90 receives e(t) and l(t) signals and directs operation of the accumulator 88, which, in cooperation with a collection of two multipliers 90, 92, two squaring circuits 94, 96 and two summation circuits 98, 100, generates a sum output equivalent to $(E+L)^2$ and a difference output equivalent to $(E^2-L^2)$.

It will be appreciated from the foregoing that the present invention represents a significant improvement in the field of detection and synchronization circuits for PN signals. In particular, the present invention provides for optimal performance, in terms of minimum signal-to-noise ratio, with simplified hardware of the type usually associated with a performance degraded by 3 dB in minimum signal-to-noise ratio. It will also be appreciated that, although an embodiment of the invention has been described in detail for purposes of illustration, various modifications may be made without departing from the spirit and scope of the invention. Accordingly, the invention is not to be limited except as by the appended claims.

I claim:

1. A circuit for generating signals for detecting and synchronizing with a received pseudorandom (PN) signal, the circuit comprising:
   a source of early and late reference PN signals spaced apart in time by one chip interval of the PN signal;
   a single digital multiplier, for multiplying successive values of the received signal and the early reference signal, to produce a product signal;
   a demultiplexer, for directing the product signal over first and second alternate paths; and
   accumulation means associated with each of the alternate paths, for accumulating the product signal in each path, over a selected signal burst period, to produce for each burst period a signal on the first alternate path equivalent to the sum of the early and late signals, and a signal on the second alternate path equivalent to the difference of the early and late signals;
   wherein the demultiplexer is controlled to select the first alternate path when the early and late reference signals have the same value, and to select the second alternate path when the early and late reference signal have different values;
   whereby the digital multiplier is time-shared by the first and second alternate paths, but without loss of data or degradation in performance.

2. A circuit as defined in claim. 1, wherein the accumulation means includes:
   an integrator, for integrating values of the received PN signal over each chip interval of the PN signal, prior to multiplication by the early reference signal;
   a first summation circuit in the first alternate path, for accumulating signals equivalent to the sum of the early and late reference signals over each successive burst period; and, a second summation circuit in the second alternate path, for accumulating signals equivalent to the difference between the early and late reference signals over each successive burst period;

wherein integration of the received signal over each chip period is performed prior to multiplication by the early reference signal.

3. A circuit as defined in claim 2, wherein:

the integrator operates on the received signal in analog form;

the circuit further comprises an analog-to-digital converter between the integrator and the digital multiplier.

4. A circuit as defined in claim 2, wherein:

the first alternate path further includes a magnitude squaring circuit, to produce a signal equivalent to the square of the sum of the early and late reference signals derived from the first summation circuit, for use in detection of the received signal; and the second alternate path further includes a dot product circuit, having one input equivalent to the sum of the early and late reference signals, derived from the first summation circuit, and one input equivalent to the difference of the early and late reference signals, derived from the second summation circuit, wherein the dot product circuit produces a signal equivalent to the difference between the square of the early reference signal and the square of the late reference signal, for use in synchronizing with the received signal.

5. A circuit as defined in claim 1, wherein:

the first alternate path further includes a magnitude squaring circuit, to produce a signal equivalent to the square of the sum of the early and late reference signals, for use in detection of the received signal; and the second alternate path further includes a dot product circuit, having one input equivalent to the sum of the early and late reference signals, derived from the first alternate path, and one input equivalent to the difference of the early and late reference signals, derived from the second alternate path, wherein the dot product circuit produces a signal equivalent to the difference between the square of the early reference signal and the square of the late reference signal, for use in synchronizing with the received signal.

6. A method for generating signals for detecting and synchronizing with a received pseudorandom (PN) signal, the method comprising the steps of:

generating early and late reference PN signals spaced apart in time by one chip interval of the received PN signal;

digital multiplying successive values of the received signal and one of the reference signals, to produce a product signal;

demultiplexing the product signal over first and second alternate paths; and accumulating the product signal in each path, over a selected signal burst period, to produce for each burst period a signal on the first alternate path equivalent to the sum of the early and late signals, and a signal on the second alternate path equivalent to the difference of the early and late signals;

wherein the demultiplexing step includes selecting the first alternate path when the early and late reference signals have the same value, and selecting the second alternate path when the early and late reference signals have different values;

whereby the step of digitally multiplying is time shared by the first and second alternate paths, but without loss of data or degradation in performance.

7. A method as defined in claim 6, wherein the accumulating step includes:

integrating values of the received PN signal over each chip interval of the PN signal, prior to multiplication by the early reference signal;

accumulating signals, in the first alternate path, equivalent to the sum of the early and late reference signals over each successive burst period; and accumulating signals, in the second alternate path, equivalent to the difference between the early and late reference signals over each successive burst period;

wherein integration of the received signal over each chip period is performed prior to multiplication by the early reference signal.

8. A method as defined in claim 7, wherein:

the step of integrating the received PN signal operates on the received signal in analog form;

the method further comprises the step of converting the signals produced by the integrating step from analog to digital form, before processing by the digital multiplying step.

9. A circuit as defined in claim 7, wherein:

the method further includes, for use in the first alternate path, the step of magnitude squaring, to produce a signal equivalent to the square of the sum of the early and late reference signals derived from the step of accumulating signals in the first alternate path, for use in detection of the received signal; and the second alternate path further includes the step of computing a dot product of a first input equivalent to the sum of the early and late reference signals, derived from the accumulating step in the first alternate path, and a second input equivalent to the difference of the early and late reference signals, derived from the accumulating step in the second alternate path, wherein the dot product signal produced is equivalent to the difference between the square of the early reference signal and the square of the late reference signal, for use in synchronizing with the received signal.

10. A circuit as defined in claim 6, wherein:

the method further includes, for use in the first alternate path, the step of magnitude squaring, to produce a signal equivalent to the square of the sum of the early and late reference signals, for use in detection of the received signal; and the method further includes, for use in the second alternate path, the step of computing a dot product of a first input signal equivalent to the sum of the early and late reference signals, derived from the first alternate path, and a second input signal equivalent to the difference of the early and late reference signals, derived from the second alternate path, to produce a signal equivalent to the difference between the square of the early reference signal and the square of the late reference signal, for use in synchronizing with the received signal.

* * * * *